UNITED STATES PATENT OFFICE.

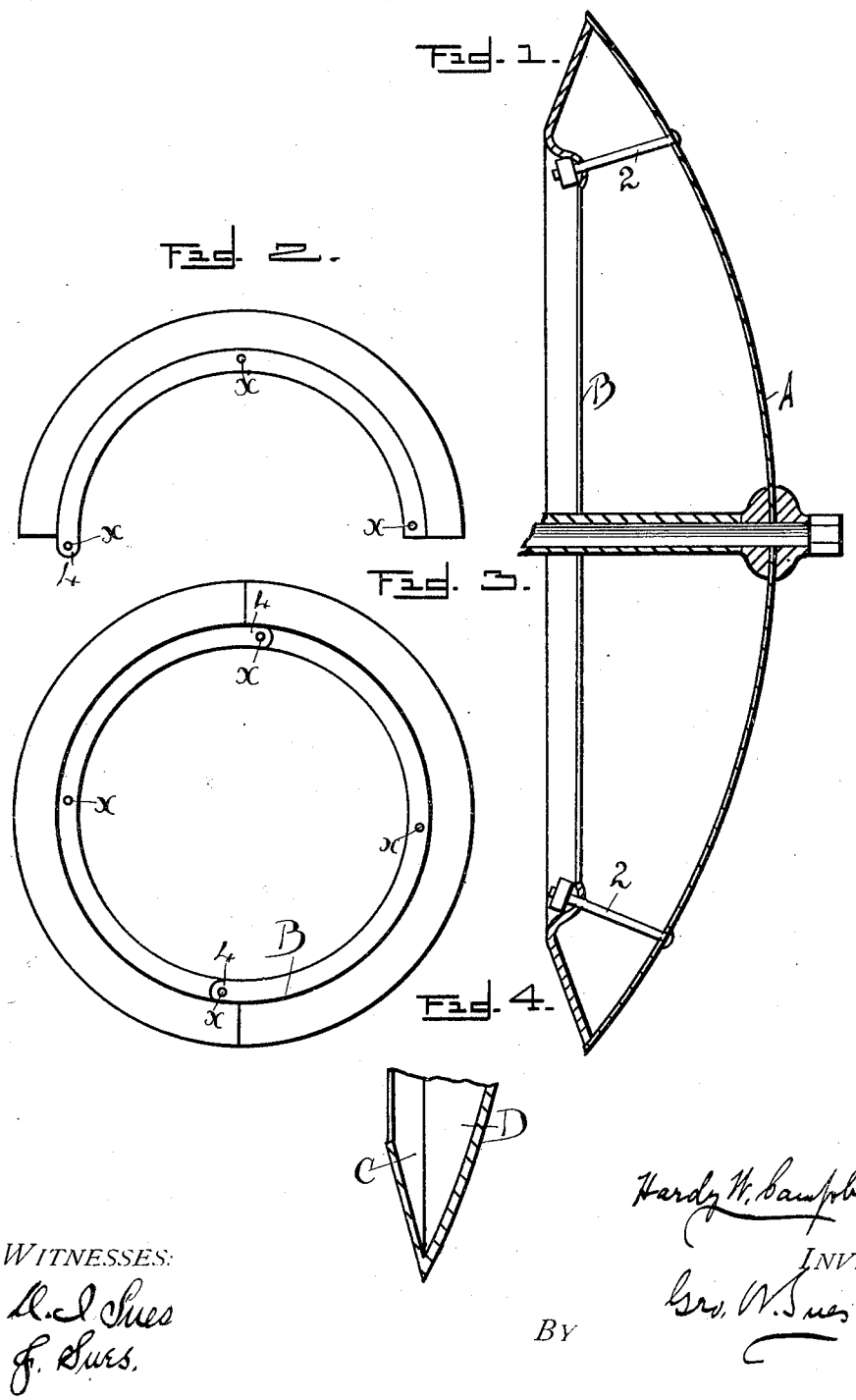

HARDY W. CAMPBELL, OF BETHANY, NEBRASKA.

DISK SUBSURFACE-PACKER.

1,103,938. Specification of Letters Patent. Patented July 21, 1914.

Application filed May 7, 1908. Serial No. 431,384.

*To all whom it may concern:*

Be it known that I, HARDY W. CAMPBELL, a citizen of the United States, and a resident of Bethany, in the county of Lancaster and State of Nebraska, have invented a new and useful Disk Subsurface-Packer, the aim of my invention being to provide an attachment for disk harrows.

In the treatment of practically all soils, more especially in the arid and semi-arid districts, the storing, conserving and controlling of the moisture, together with the development of nitrates, bacteria and humus, forms a most important item in the treatment of the soils. In other words it is found by repeated experiments that certain physical or mechanical conditions of the soil must exist. A further important factor for successful crop growing is a fine firm stratum beneath the surface or in the lower portion of the plowed soil commonly known as the seed or root bed. The fining and firming of the lower portion increases the water holding capacity of the soil, promoting a more liberal growth of lateral roots and feeders, thus forcing a more liberal stooling of the grain plant.

This I accomplish in contriving a disk harrow used exactly as disk harrows are used today, but my harrow differs in that the disks present a V-shaped or wedge edge and this edge is forced into the soil, resulting in the soil being crowded downward and laterally outward, the line of pressure being at right angles to the bevel. It is important that the wedge face of the disk is not too long upon the inner side in order that the lumps may not be too finely pulverized. This packing of the subsoil, experiments have disclosed, has a tendency to preserve the moisture.

In the accompanying drawings Figure 1, shows a central sectional view of a harrow provided with one of my sub-surface packers; Fig. 2 shows a front view of one half of the annulus forming my packer; Fig. 3 shows a front view, while Fig. 4, shows a modification.

As has been set forth, the aim of my invention is to provide a disk harrow with a device performing the function of a sub-surface packer. This I accomplish in attaching to a dished harrow disk as is shown at A in Fig. 1, a preferably two part dished ring or annulus B. This ring or annulus B is of frusto-conical form and is preferably formed of sheet steel or other suitable metal and is of a diameter slightly less than that of the disk A as disclosed in Fig. 1 and has the dished portion as is shown in Fig. 1 perforated at suitable points as is shown also in Figs. 2 and 3 so that suitable bolts 2 may be carried through the disks A which are also suitably perforated then through the openings X and finally be secured by means of the burs or nuts 3 so that the harrow disks are provided with a V-shaped cutting edge. The inner peripheral edge of these disk rings are dished in order that the bolts will not project outward and gather weeds and brush. Where my surface packing rings are to be attached to disk harrows already made, for the sake of convenience, I divide these surface packing rings into two sections as is shown in Fig. 3 providing each ring with a perforated ear 4 as shown so that these packing rings may be properly secured.

The concavo-convex harrow disks are made with smooth inner and outer surfaces entirely free from shoulders or projections, so that when said disks are used without the annulus packing rings they act as ordinary harrow disks, and do not have any shoulders or projections to catch in the soil or gather weeds or other material.

It is of course understood that these packing rings could be in one piece in which instance however, the disks would have to be removed from the harrow and in order to obviate that step I have divided the rings into two sections. So also if desired could the harrow disk and the sub-surface packing ring be cast or made all in one as is shown in Fig. 4 where a broken portion of the disk D has its lower edge recurved to form the packing surface C.

By means of the dished packing ring, and the concavo-convex disk A, a V-shaped cutter is formed. In some localities, owing to the condition of the soil, a sharp, well defined cutting edge is necessary in order that the disk will properly cut through the soil, and where this is necessary, I make the packing ring of a diameter less than that of the disk. This insures the edge of the disk A, projecting beyond the edge of the packing ring.

It is of course understood that these disks may be of any suitable size. And having thus described my said invention what I claim as new and desire to secure by U. S. Letters Patent is—

1. The combination, with a concavo-convex disk provided with a peripheral cutting edge and bolt holes near said edge, of a packing ring of less diameter than said disk and have its outer edge adapted to fit snugly against the inner surface of said disk near the cutting edge thereof, said ring forming with said disk a V-shaped cutting surface, the inner edge of said ring being inwardly turned and having bolt holes therein and bolts passing through said holes and through the holes in said disk.

2. The combination, with a concavo-convex disk, a ring having its outer edge seated against the concave surface of said disk near the periphery thereof, said ring having an inwardly turned portion and bolts passing through said disk and having threaded ends and lock nuts in said inwardly turned portion, for the purpose specified.

3. The combination, with a concavo-convex harrow disk having smooth inner and outer surfaces, without shoulders or projections, of a sheet metal frusto-conical packing ring of less diameter than said disk, and having its outer edge adapted to fit snugly against the inner surface of said disk near the cutting edge thereof, said ring forming with said disk a V-shaped cutting surface, and means rigidly securing the edge of said ring to the outer portion of said disk.

Signed in the presence of two witnesses.

HARDY W. CAMPBELL.

Witnesses:
 ORA WILLIAMS,
 ANGELINA GASKILL.

---

Copies of this patent may be obtained for five cents each, by addressing the "Commissioner of Patents, Washington, D. C."